US007694988B2

(12) United States Patent
Sturtevant

(10) Patent No.: US 7,694,988 B2
(45) Date of Patent: Apr. 13, 2010

(54) BICYCLE SOUND GENERATOR

(75) Inventor: Timothy S. Sturtevant, Bedford, NY (US)

(73) Assignee: Sturtevant Productions Inc., Bedford, NY (US)

(*) Notice: Subject to any disclaimer, the term of this patent is extended or adjusted under 35 U.S.C. 154(b) by 149 days.

(21) Appl. No.: 12/038,089

(22) Filed: Feb. 27, 2008

(65) Prior Publication Data
US 2009/0212531 A1 Aug. 27, 2009

(51) Int. Cl.
B62J 9/00 (2006.01)
G09F 21/04 (2006.01)
A63H 5/00 (2006.01)

(52) U.S. Cl. .................. 280/288.4; 40/587; 446/404

(58) Field of Classification Search ............. 280/288.4; 40/587, 668, 316; 24/16 BP; 446/404
See application file for complete search history.

(56) References Cited

U.S. PATENT DOCUMENTS

| 2,624,156 | A | * | 1/1953 | Meyer, Jr. ............... 446/404 |
| 2,736,136 | A | * | 2/1956 | Modlin .................. 446/404 |
| 3,097,447 | A | * | 7/1963 | Peham et al. ............ 446/404 |
| 3,905,151 | A | * | 9/1975 | Zweigle ................. 446/404 |
| 5,226,846 | A | | 7/1993 | Onori |
| D341,554 | S | * | 11/1993 | Freling ................. D12/114 |
| 5,611,558 | A | | 3/1997 | Randmae |
| 6,039,338 | A | | 3/2000 | Perea et al. |
| 6,234,864 | B1 | | 5/2001 | Onori |
| 6,394,875 | B1 | | 5/2002 | Smith |
| 6,565,107 | B1 | * | 5/2003 | Hartman ............... 280/288.4 |
| 6,589,097 | B2 | | 7/2003 | Smith |
| D479,162 | S | * | 9/2003 | Skibo ................... D12/114 |
| 2004/0116045 | A1 | * | 6/2004 | Coleman ................ 446/441 |

FOREIGN PATENT DOCUMENTS

JP 2001-322582 A1 11/2001

OTHER PUBLICATIONS

Press Release by Kevin Nelson of Playtrix, LLC, Greensboro, North Carolina, Jul. 24, 2006 for bicycle noisemaker device called the "Spokester" [www.spokester.com].

* cited by examiner

Primary Examiner—Lesley Morris
Assistant Examiner—Daniel Yeagley
(74) Attorney, Agent, or Firm—Michael J. Donohue; Davis Wright Tremaine LLP

(57) ABSTRACT

A bicycle sound generator manufactured using a thin, deformable, plastic material. The sound generator is wrapped around an attachment location, such as a bicycle fork, and secured using a fastener. In an exemplary embodiment, the fastener is a cable tie with a one-way tightening mechanism to prevent the sound generator from coming loose once it has been attached at the attachment location. The sound generator may be rotated about the attachment location to come into an engagement position where a free-end portion of the sound generator makes contact with the spokes of a rotating wheel. When no sound is desired, the sound generator may be rotated such that the free-end portion is disengaged from the spokes and produces no sound. Graphical images, such as decorations, team logos, political messages and the like may be added to the sound generator.

31 Claims, 14 Drawing Sheets

US 7,694,988 B2

BICYCLE SOUND GENERATOR

BACKGROUND OF THE INVENTION

1. Field of the Invention

The present invention is directed generally to an apparatus and method for sound generation on a bicycle.

2. Description of the Related Art

Many readers will recall childhood memories of attaching a baseball card to a bicycle frame using a clothespin to create a flapping "motorcycle" sound as the baseball card is struck by the spokes of the rotating bicycle wheel. While such an approach was inexpensive, the baseball card would soon wear out or become bent so as to fail to produce the desired sound. In addition, if the baseball card became wet, it was no longer able to produce the desired sound.

Since that time, others have attempted various forms of bicycle sound generators. Some are directed to attachment mechanisms that are expensive to manufacture, difficult to install, and may damage the paint finish on the bicycle. For example, one known approach comprises a bicycle sound generator made of stiff plastic. This type of generator includes a flap portion to extend into and engage the spokes of the bicycle and a preformed attachment mechanism with a partially cylindrical interior portion to clip over a rounded bicycle fork. A gap along the length of the cylindrical plastic attachment mechanism allows the sound generator to be snapped onto a round bicycle fork. The drawback of this approach is that the cylindrical-shaped attachment mechanism is only useable with a round bicycle fork. Bicycle forks commonly have an oval cross section fork, which is incompatible with the cylindrical attachment mechanism of the known bicycle sound generator. In addition, the stiff plastic may damage the paint of the bicycle fork when it is snapped into place. Removal of the bicycle sound generator may cause further damage to the paint at the point of attachment.

Therefore, it can be appreciated that there is a significant need for a bicycle sound generator having a simple attachment mechanism, readily adaptable to different cross sectional shapes at the bicycle attachment location and attachment in a manner that will not damage the finish of the bicycle. The present invention provides this, and other advantages as will be apparent from the following detailed description and accompanying figures.

BRIEF DESCRIPTION OF THE SEVERAL VIEWS OF THE DRAWING(S)

DETAILED DESCRIPTION OF THE INVENTION

Figure 1:
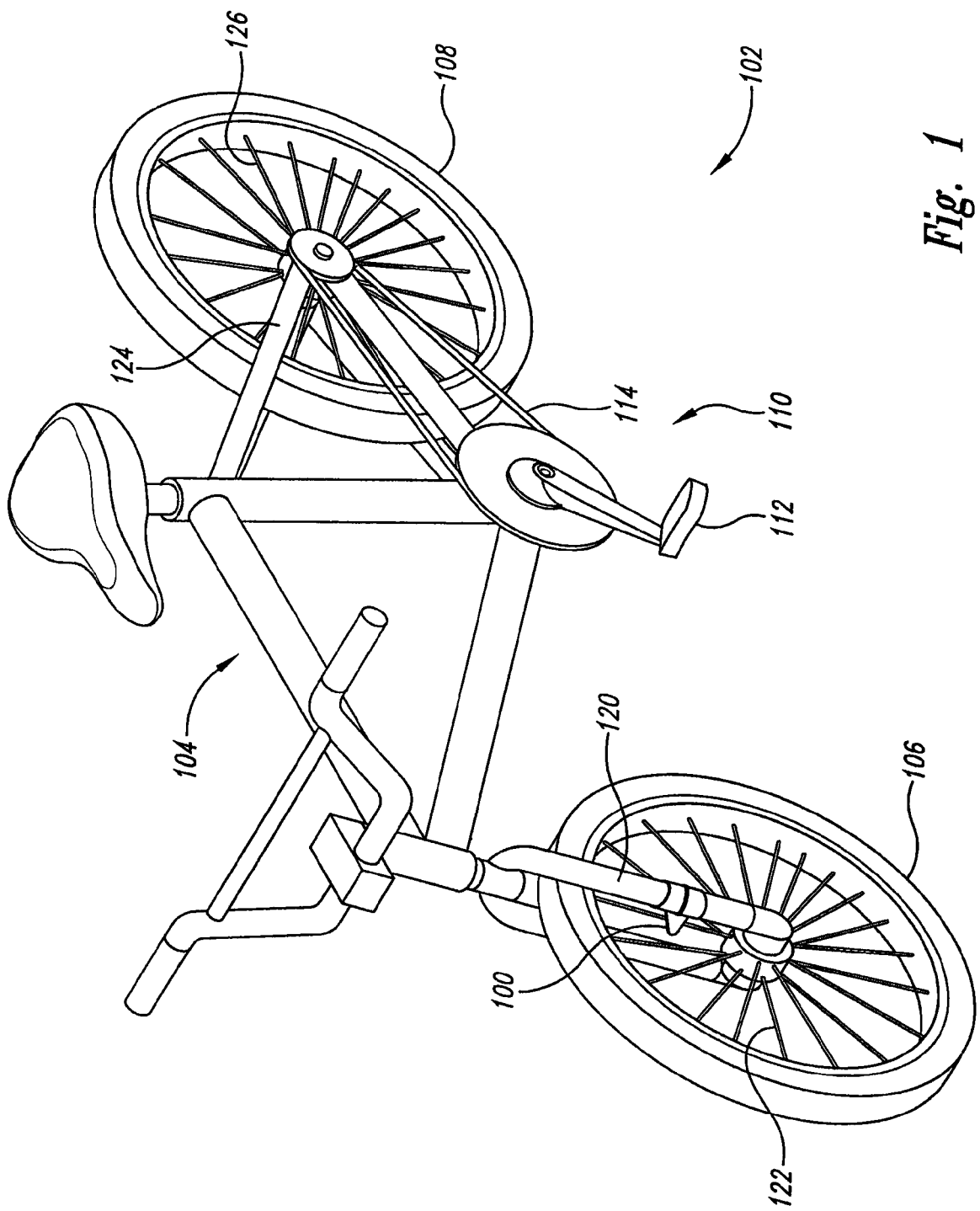
FIG. 1 is a perspective view of a bicycle with the sound generator of the present invention attached thereto.

The present disclosure is directed to a sound generator 100 mounted on a bicycle 102. The bicycle 102 includes a frame 104, and front and rear wheels 106-108. The bicycle 102 illustrated in FIG. 1 has a propulsion system 110 comprising pedals 112 and a drive mechanism 114, which is typically a bicycle chain. The operator moves the pedals 112 to rotate the drive mechanism 114 to thereby propel the bicycle 102. For the sake of simplicity, other mechanisms, such as gears, brakes, and the like are not shown in FIG. 1.

The sound generator 100 may be connected to the bicycle 102 at a number of different locations, designated herein as attachment locations. One attachment location, illustrated in FIG. 1, is a front fork 120. As will be described in greater detail below, the bicycle sound generator 100 is positioned to make contact with spokes 122 of the front wheel 106 as the front wheel rotates.

Those skilled in the art will appreciate that the sound generator 100 can be attached to other attachment locations, such as a rear frame member 124. In this embodiment, the sound generator 100 engages spokes 126 of the rear wheel 108. Those skilled in the art will appreciate that other suitable attachment locations on the bicycle frame are also contemplated. For example, the bicycle may have fenders (not shown) with attachment supports. The sound generator 100 may be readily attached to a fender attachment support.

Figure 2:
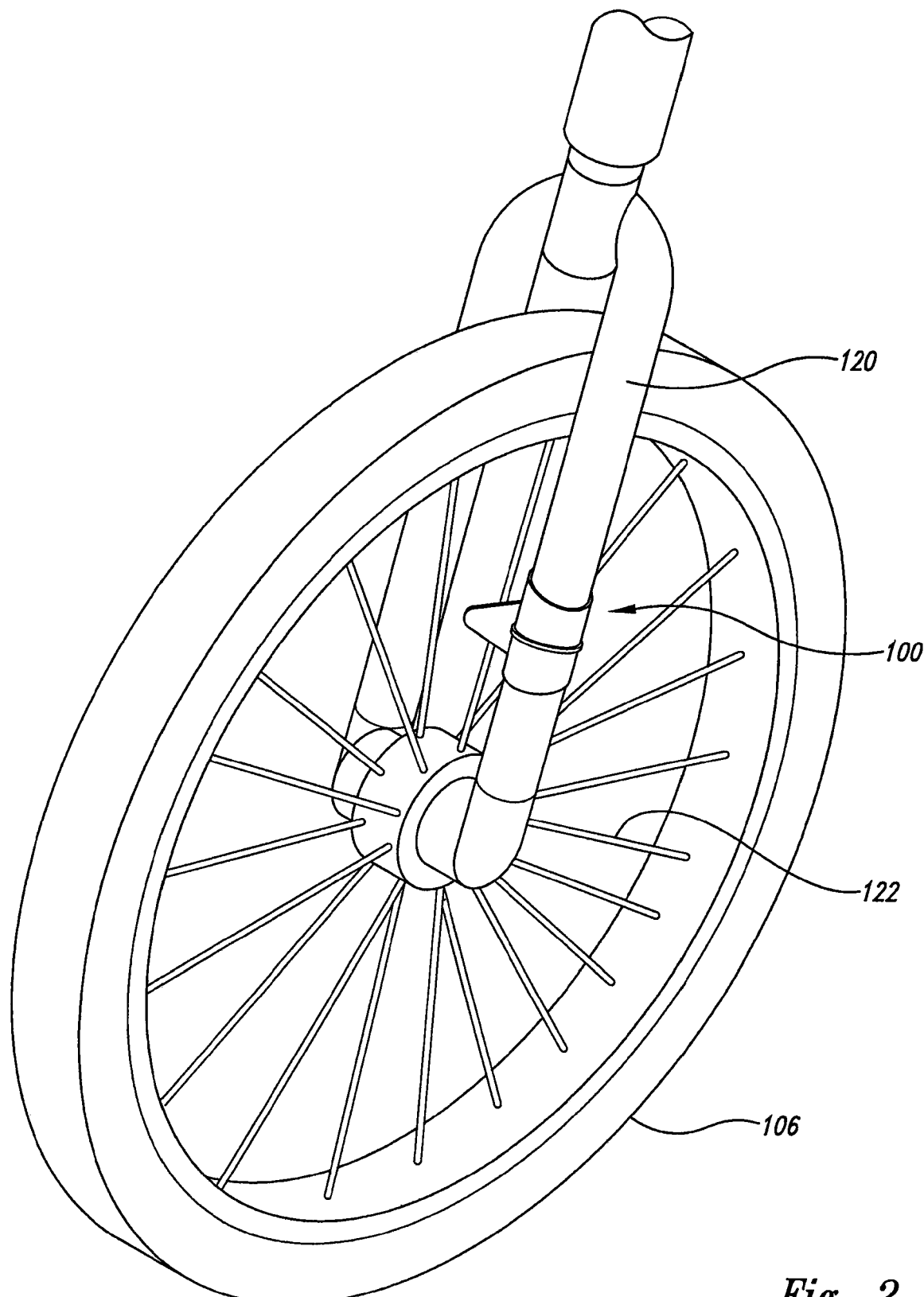
FIG. 2 is a close-up of a front wheel of the bicycle of FIG. 1 showing the bicycle sound generator in its activated position.
Figure 3:
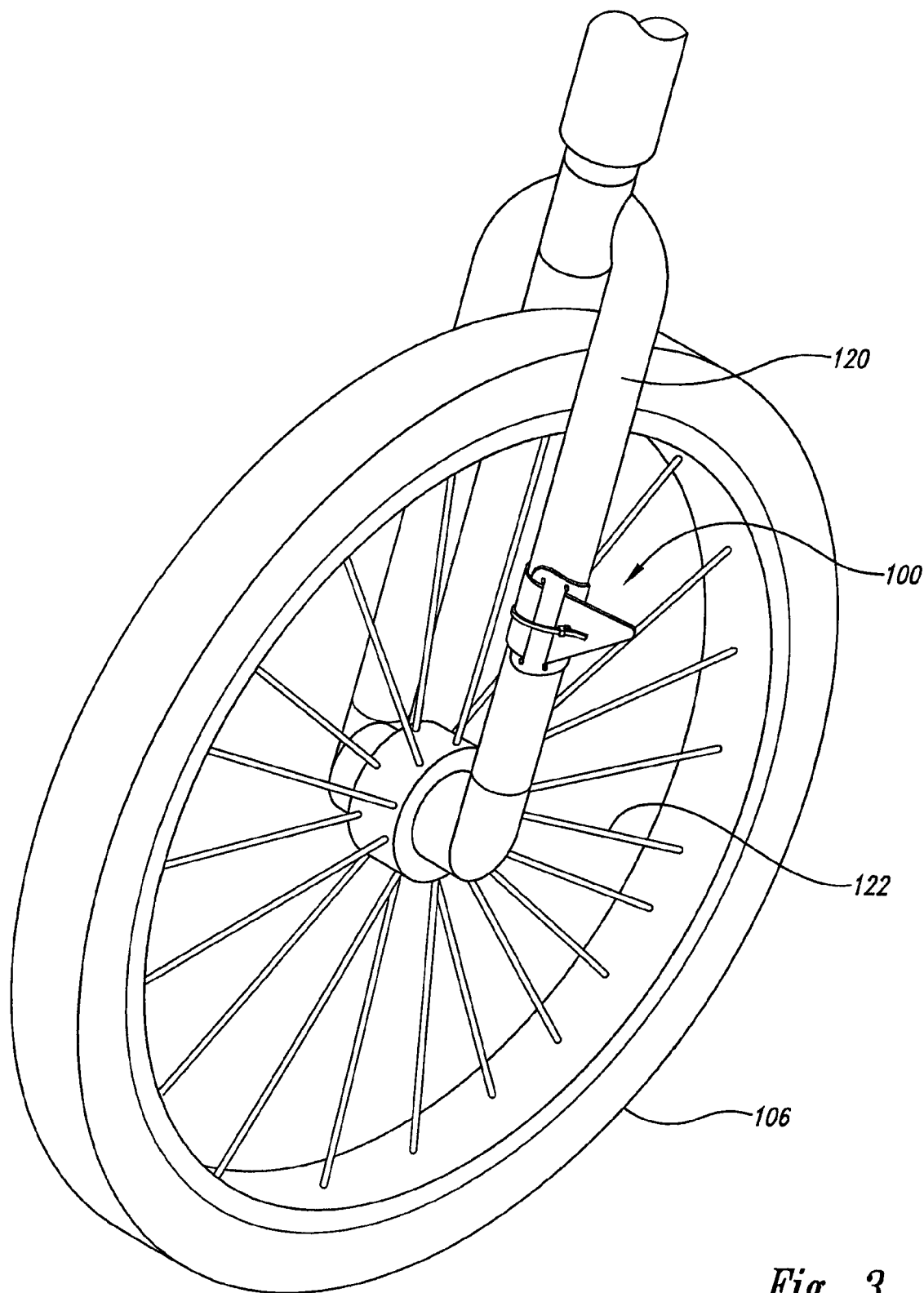
FIG. 3 is a close-up of a front wheel of the bicycle of FIG. 1 showing the bicycle sound generator in its inactivated position.

FIG. 2 illustrates a close-up of the sound generator 100 attached to the front fork 120. As will be described in greater detail below, the sound generator 100 is snugly mounted to the front fork 120, but is still capable of rotation thereon. FIG. 2 illustrates the sound generator 100 when rotated into an activated or engagement position where the sound generator encounters the spokes 122 of the front wheel 106. FIG. 3 illustrates the sound generator 100 when it has been rotated to an inactive or disengagement position such that the front wheel 106 rotates freely without the sound generator 100 engaging the spokes 122 of the front wheel.

Figure 4:
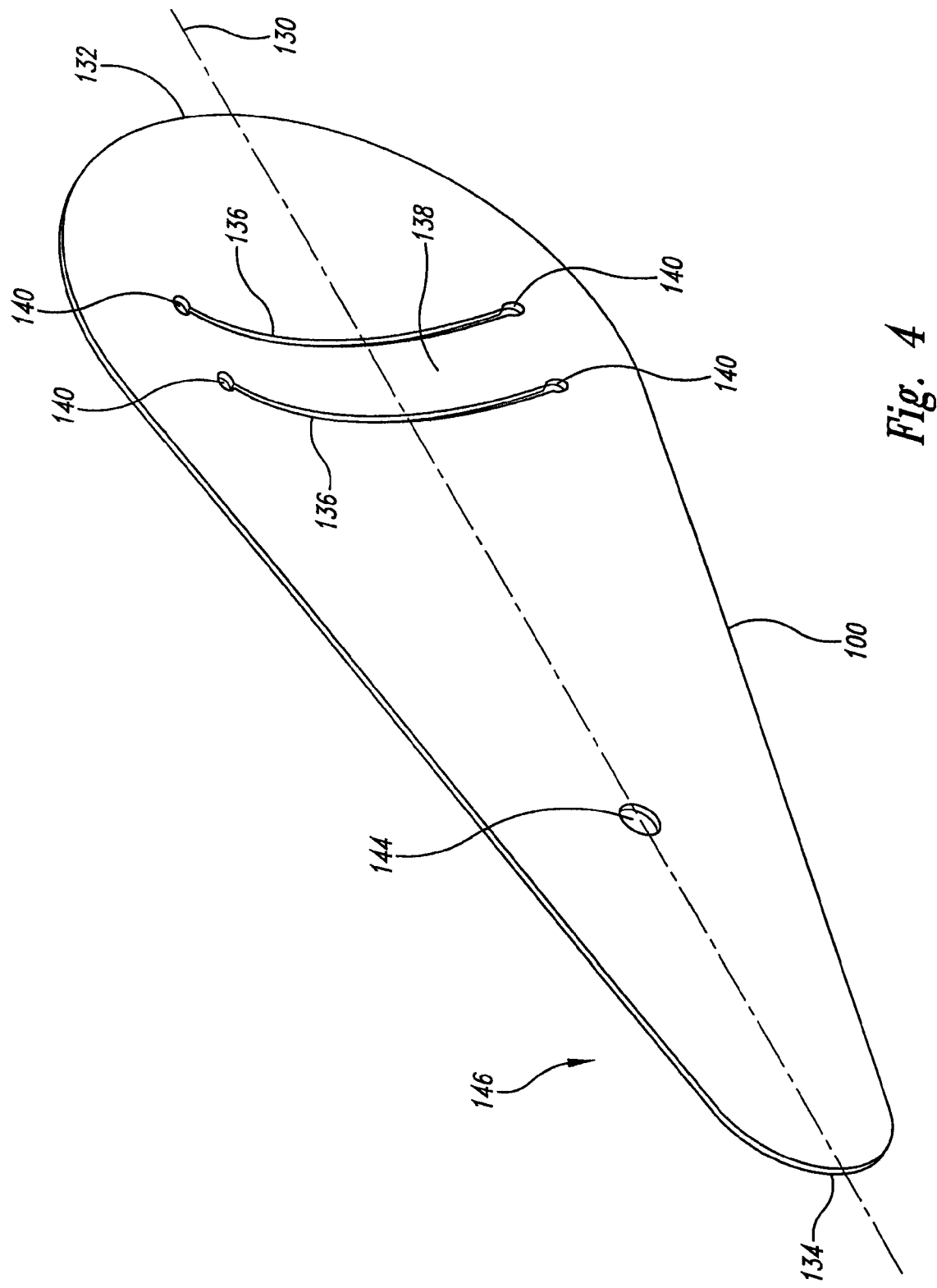
FIG. 4 is perspective view of the bicycle sound generator prior to attachment to a bicycle.

FIG. 4 is a perspective view of the sound generator 100. In an exemplary embodiment, the sound generator 100 is manufactured from flexible plastic that freely allows the sound generator to be wrapped around the attachment location, such as the front fork 120 (see FIG. 1). In an exemplary embodiment, the sound generator 100 is formed from plastic having a thickness of approximately 0.015 millimeters to 1.0 millimeters. In one embodiment, a pad (not shown) such as an adhesive-backed foam pad may be added to the sound generator 100 to provide a tight fit at the selected attachment location. As illustrated in FIG. 4, the sound generator 100 is generally elongated in shape and has a longitudinal access 130 extending from a first end 132 to a second end 134. The sound generator 100 is generally tapered from the first end 132 to the second end 134. In exemplary embodiment, the second end 134 is generally rounded in shape at its terminal end so is to reduce the possibility of breakage as the second end portion encounters the spokes (e.g., the spokes 122 of the front wheel 106). In an exemplary embodiment, the first end 132 is also generally rounded for ease of manufacturing in general aesthetic appearance. However, those skilled in the art will appreciate that the first end 132 may be manufactured in virtually any shape, such as a rectangular first end, without adversely affecting operation of the sound generator 100.

The sound generator 100 includes two parallel slits 136 extending in a direction substantially transverse to the longitudinal access 130. The slits 136 are spaced apart from each other to form a slot 138 through which the second end 134 will be inserted. This process will be described in greater detail below. Each of the slits 136 has a circular slit termination 140 at each end. Those skilled in the art will appreciate that the slit termination hole 140 may be used to relieve stress on the slit 136 during manufacturing, installation, and operation.

Figure 5:
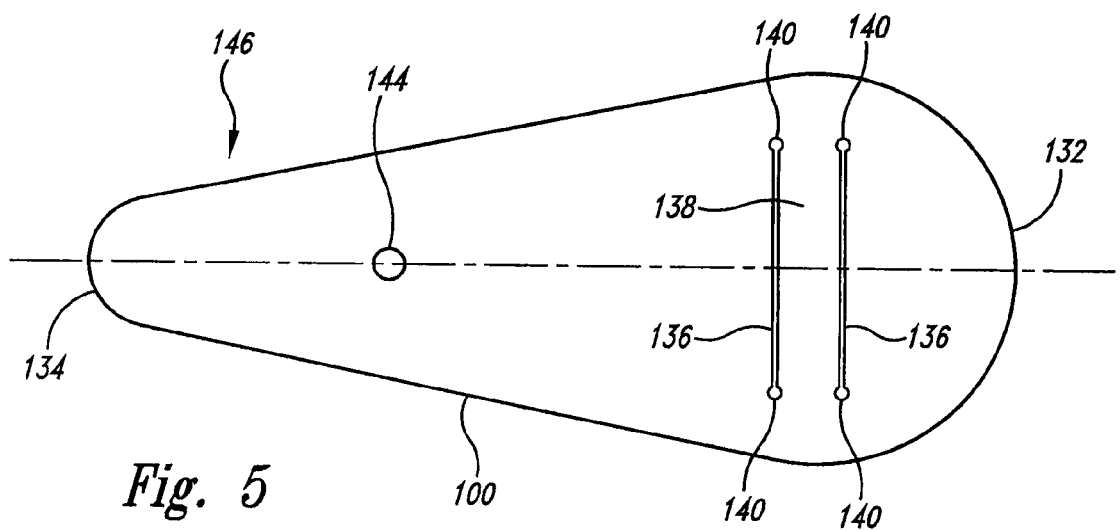
FIG. 5 is a plan view of the bicycle sound generator of FIG. 4.
Figure 6:
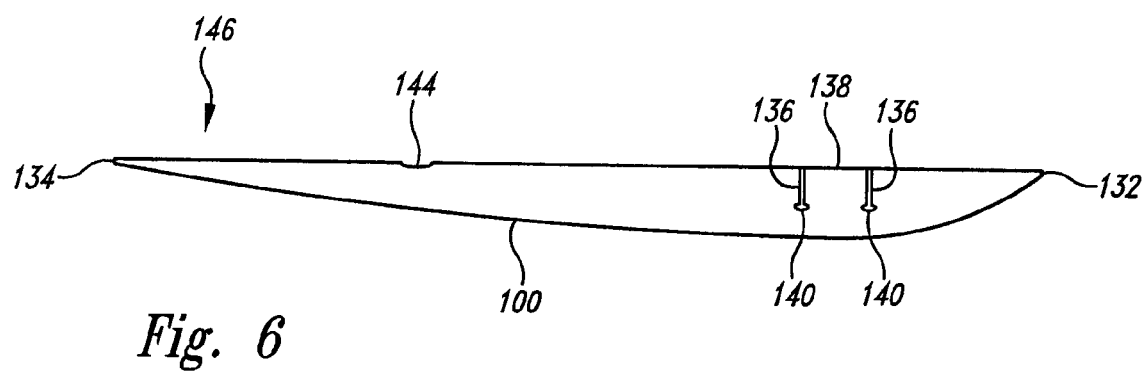
FIG. 6 is a side view of the bicycle sound generator of FIG. 4.
Figure 7:
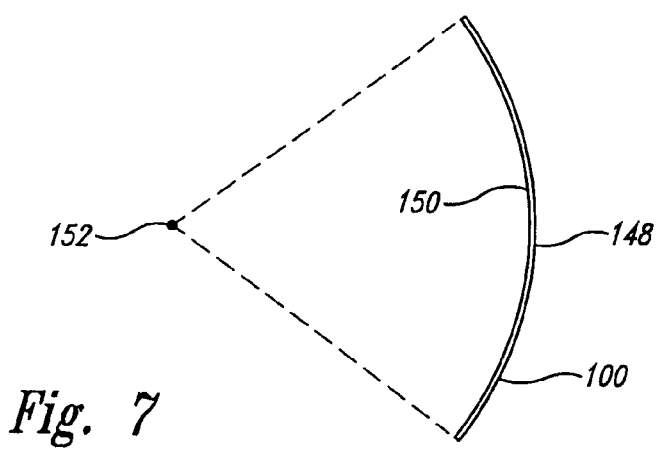
FIG. 7 is an end view of the bicycle sound generator of FIG. 4.

The sound generator 100 also has an aperture 144 positioned along the longitudinal access 130. As will be described in greater detail below, the aperture 144 is positioned at a sufficient distance from the second end 134 to allow a free-end portion 146 to extend from the attachment location and engage the spokes 122. FIG. 5 is a plan view of the sound generator 100 FIG. 4. FIG. 6 is a side view of the sound generator 100 FIG. 4. FIG. 7 is an end view of the sound generator 100 illustrating a convex side 148 and a concave side 150.

As best illustrated in the end view of FIG. 7, the sound generator 100 is formed as a cylindrical section with a cylindrical axis 152 parallel to and spaced apart from the longitudinal axis 130 (see FIG. 4). Although not essential for satisfactory operation of the sound generator 100, the cylindrical section provides an anesthetically pleasing sound when it encounters spokes 122 of the front wheel 106. Other curved shapes may also be used. The sound generator 100 is not limited by the particular curvature or lack of curvature.

Figure 8:
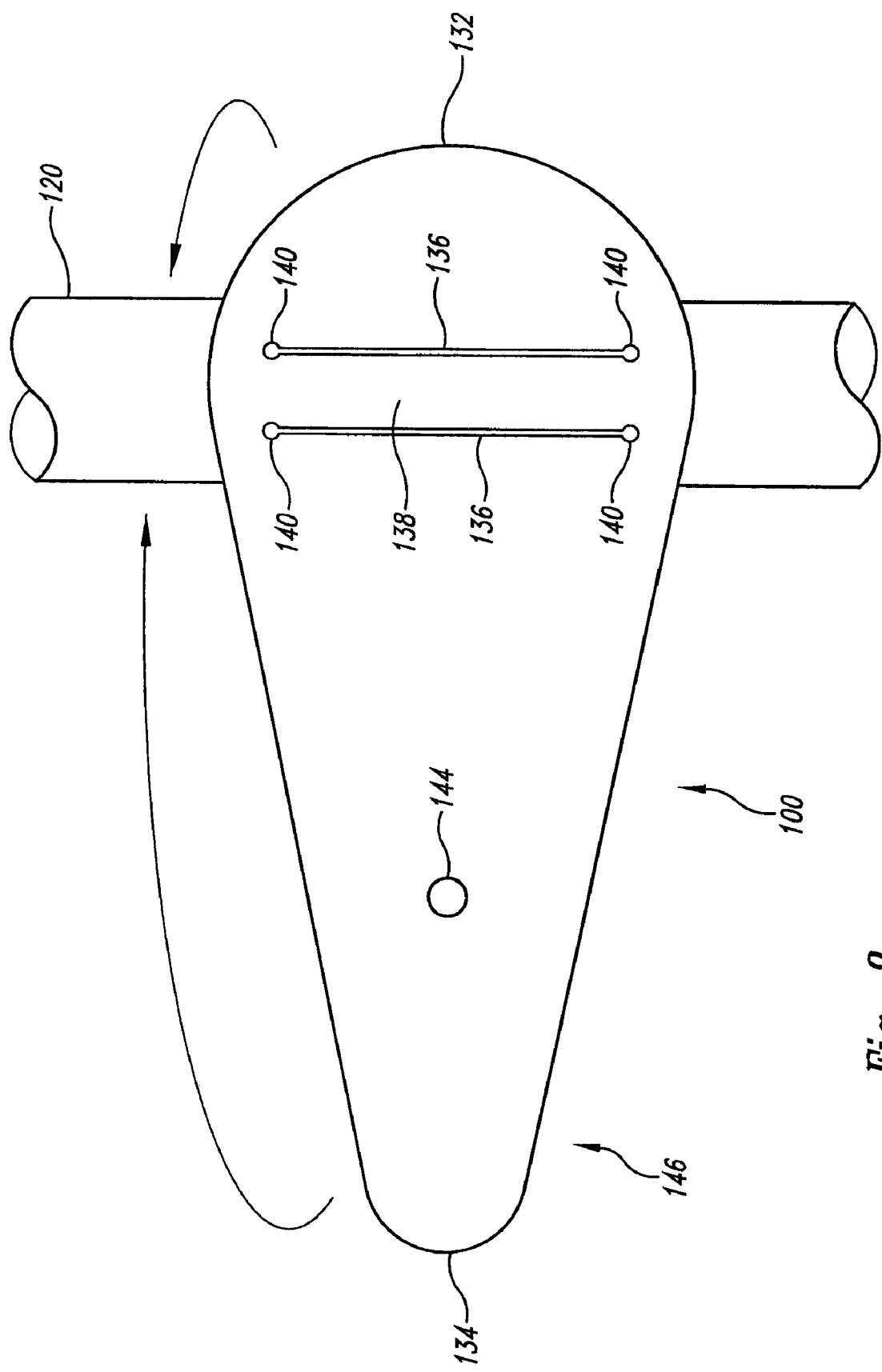
FIGS. 8-12 are a series of figures showing the attachment of the bicycle sound generator of FIG. 4 at an attachment location, such as a bicycle fork.

FIGS. 8-12 illustrate the installation of the sound generator 100 at a location, such as the front fork 106 (see FIG. 1). In FIG. 8, the concave side 150 of the sound generator 100 is pressed against the front fork 120 or other attachment location. The plastic material of the sound generator 100 is easily deformable and thus can be shaped to accommodate the particular shape of the attachment location. This is especially useful when the attachment location, such as the front fork 120 has an oval or irregular shaped cross-section.

Figure 9:
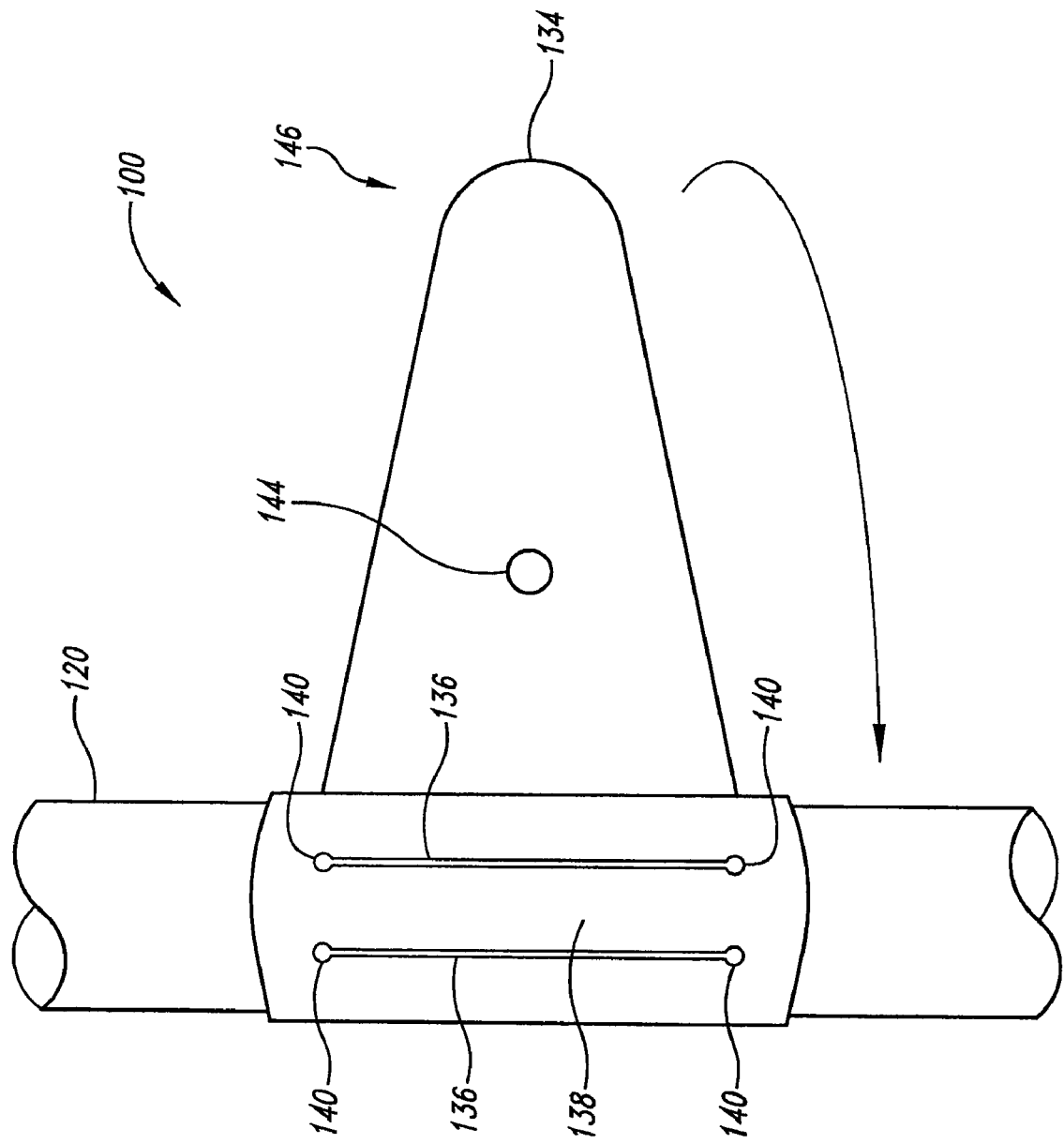
Figure 10:
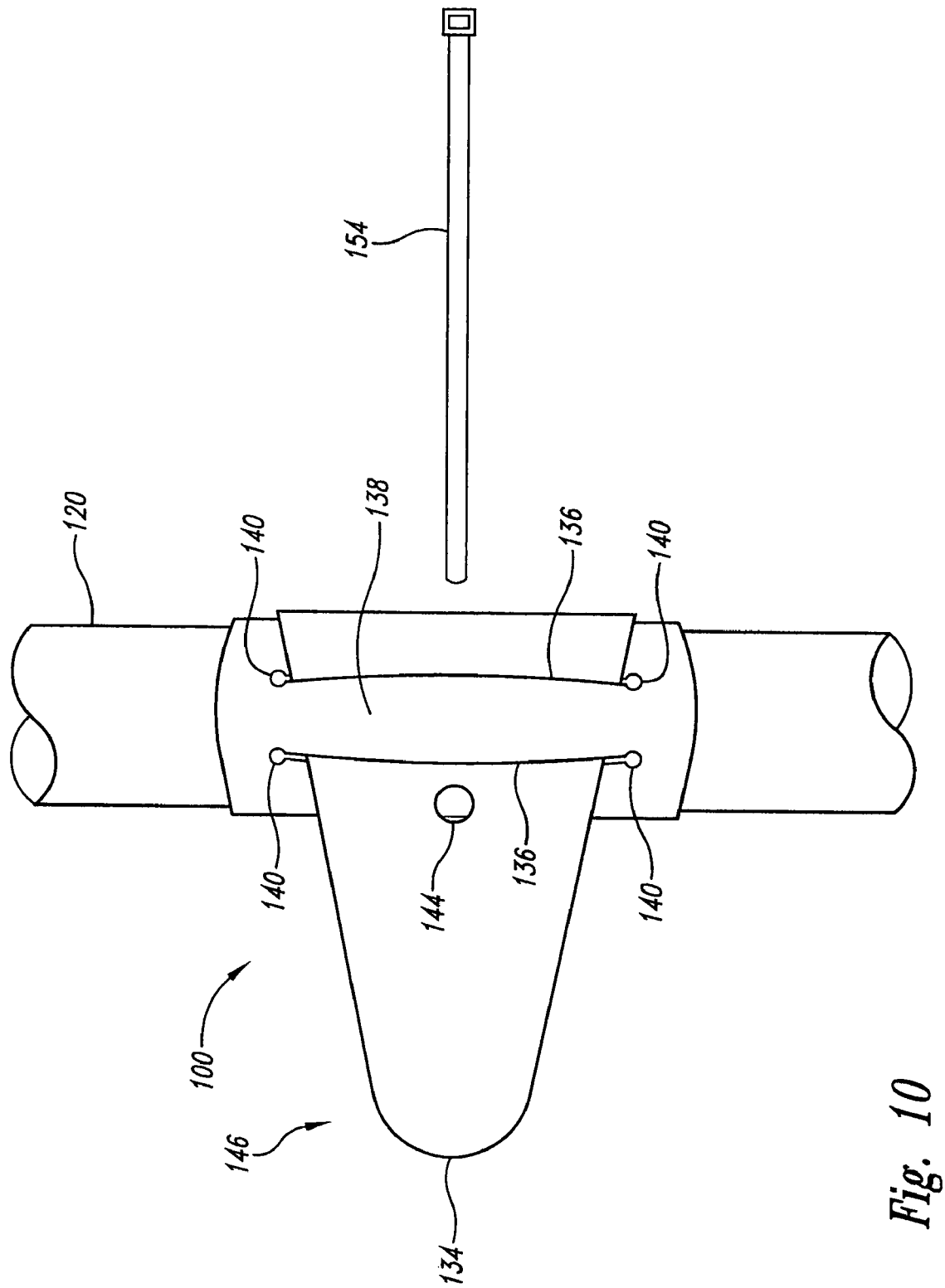

In FIG. 9, the sound generator 100 is wrapped around the fork 120 and, in FIG. 10, the free-end portion 146 of the sound generator 100 is inserted in the slot 138 by passing the second end 134 through the parallel slits 136.

Figure 11:
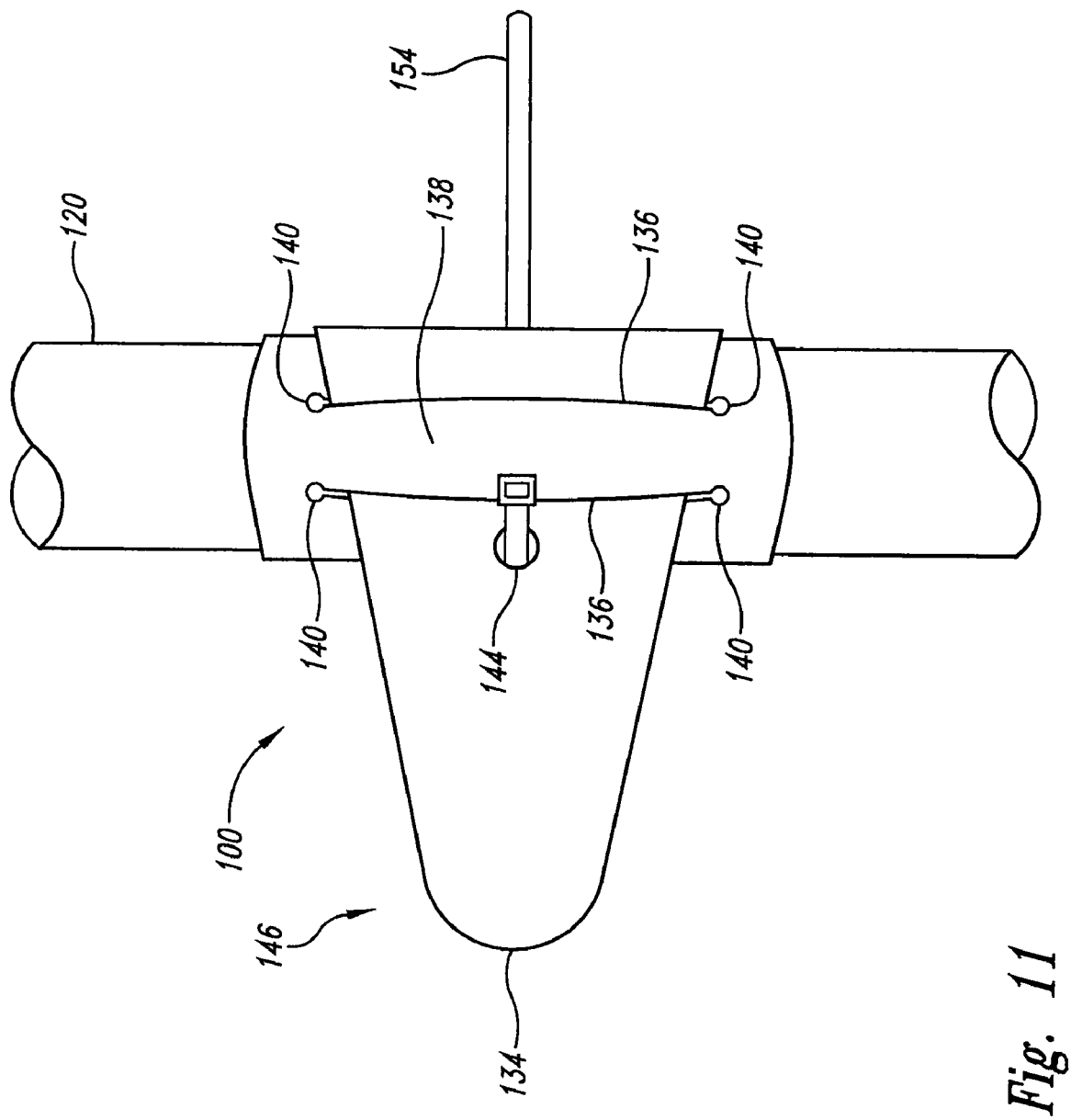

In FIG. 11, a fastener 154 is used to secure the sound generator 100. In an exemplary embodiment, the fastener 154 is a cable tie. The advantage of using a cable tie as the fastener 154 is that the ratchet mechanism of the cable tie allows it to be tightened but it will not loosen. Thus, the cable tie 154 will securely attach the sound generator 100 and, once in place, will not loosen. Those skilled in the art will appreciate that other devices may be used as the fastener 154. For example, string could be used instead of a cable tie. Waxed string may be particularly useful in this situation. As the waxed string is inserted into the aperture 144 and a knot formed, the wax melts slightly due to the friction of the knotting process. This causes the knot to be securely fastened and decreases the chances of the knot working itself loose. Twist ties or other devices, well known in the art, can be satisfactorily used to implement the fastener 154. The present invention is not limited by the particular form of the fastener 154.

Figure 12:
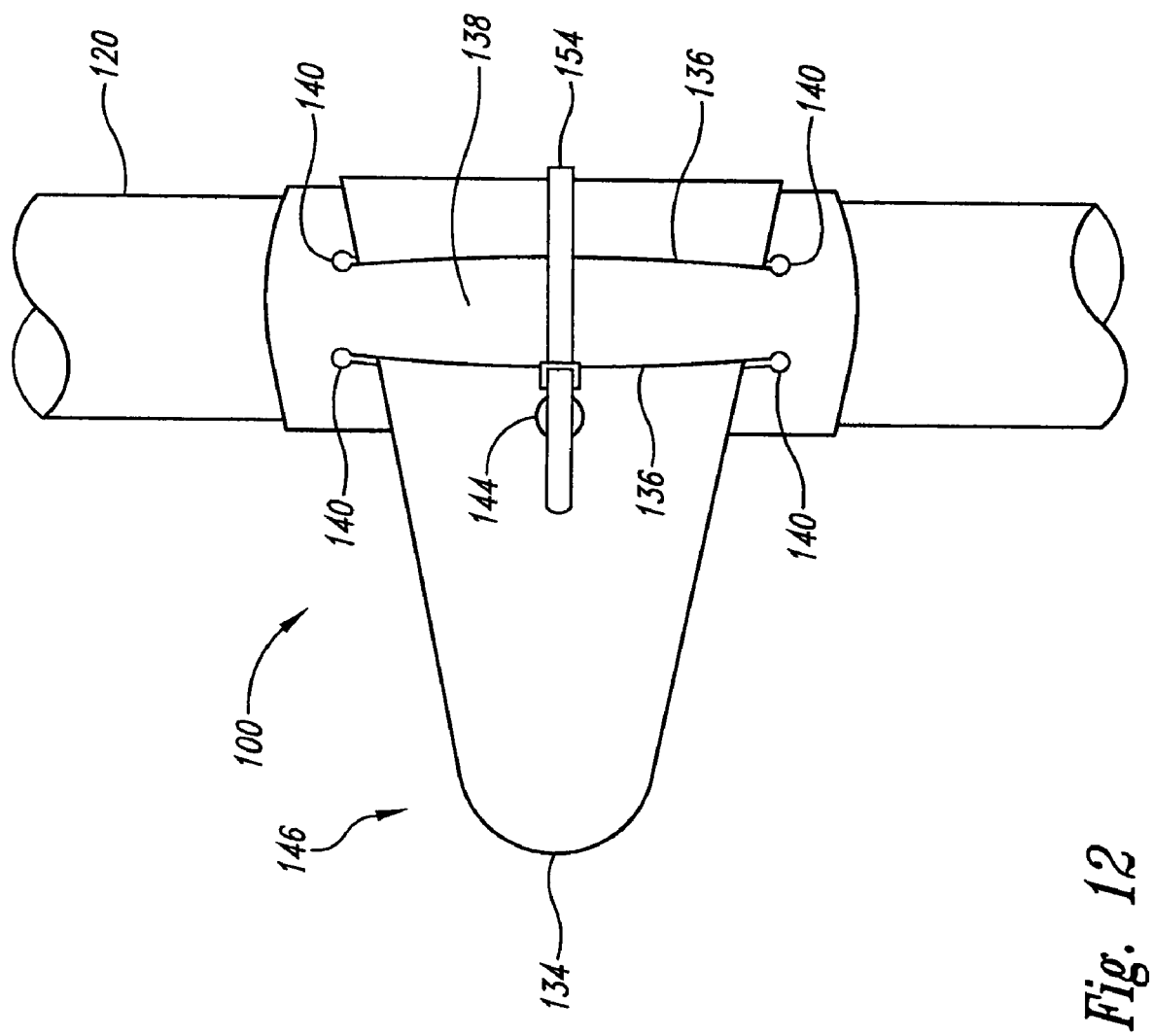

In FIG. 11, one end of the fastener 154 is inserted through the aperture 144 and wrapped around the front fork 120. In FIG. 12, the fastener 154 is secured which, in turn, secures the sound generator 100 on the front fork 120. Once installation is complete, the sound generator may be rotated about the front fork 120 to move the sound generator 100 into engagement with the spokes 122 of the front wheel 106. As previously discussed, the sound generator 100 is rotatably mounted at the attachment location. The fastener 154 securely fastens the sound generator at the attachment location. However, the plastic material used to manufacture the sound generator 100 is capable of being rotated at the attachment location. Those skilled in the art will appreciate that the use of the flexible plastic for the sound generator 100 minimizes the risk of damage to the paint on the bicycle 102.

Figure 13:
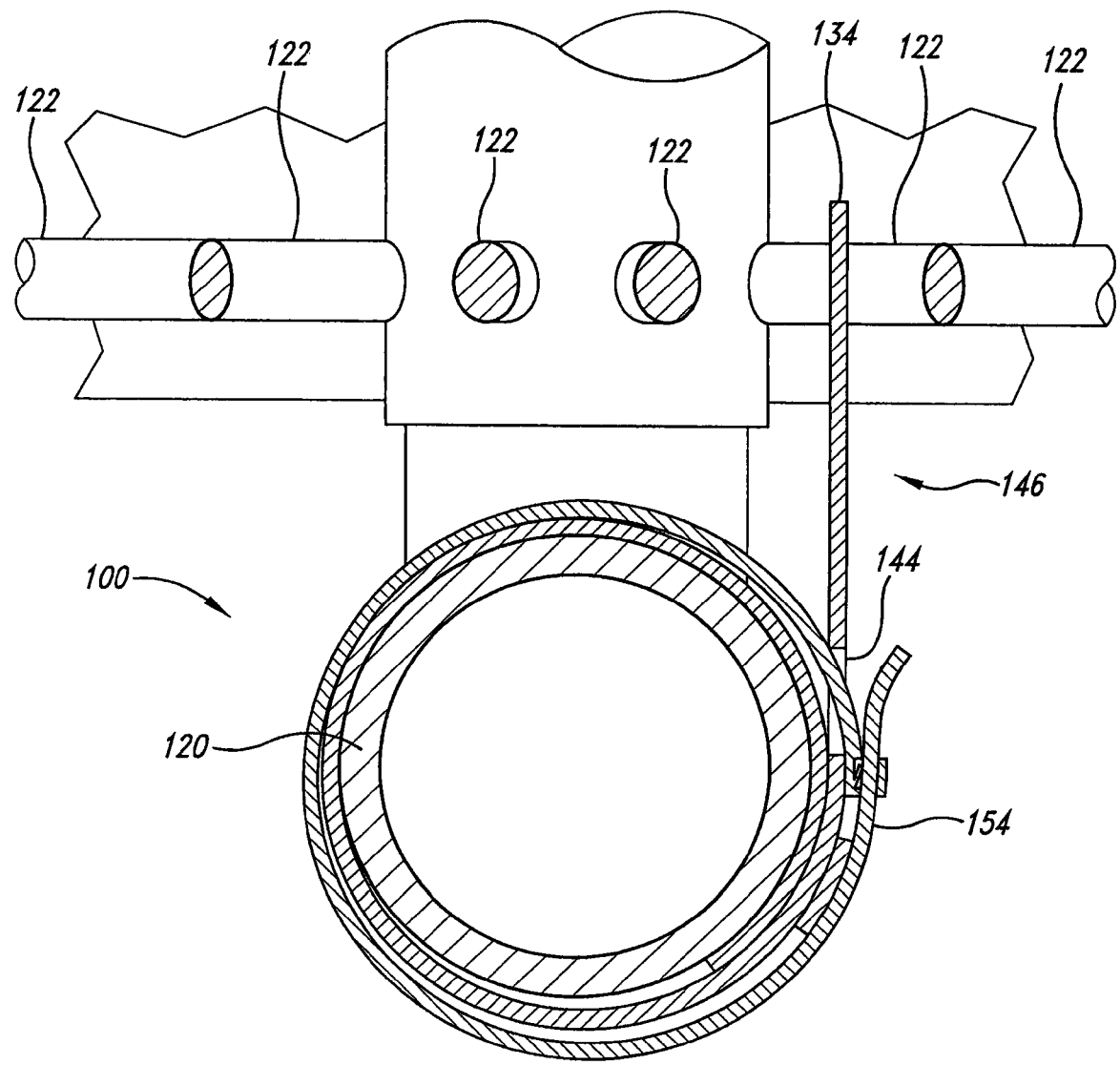
FIGS. 13-14 are cross-sectional views of the bicycle sound generator of FIG. 4 illustrating its attachment to an attachment location, such as a bicycle fork and its displacement by spokes of the bicycle.
Figure 14:
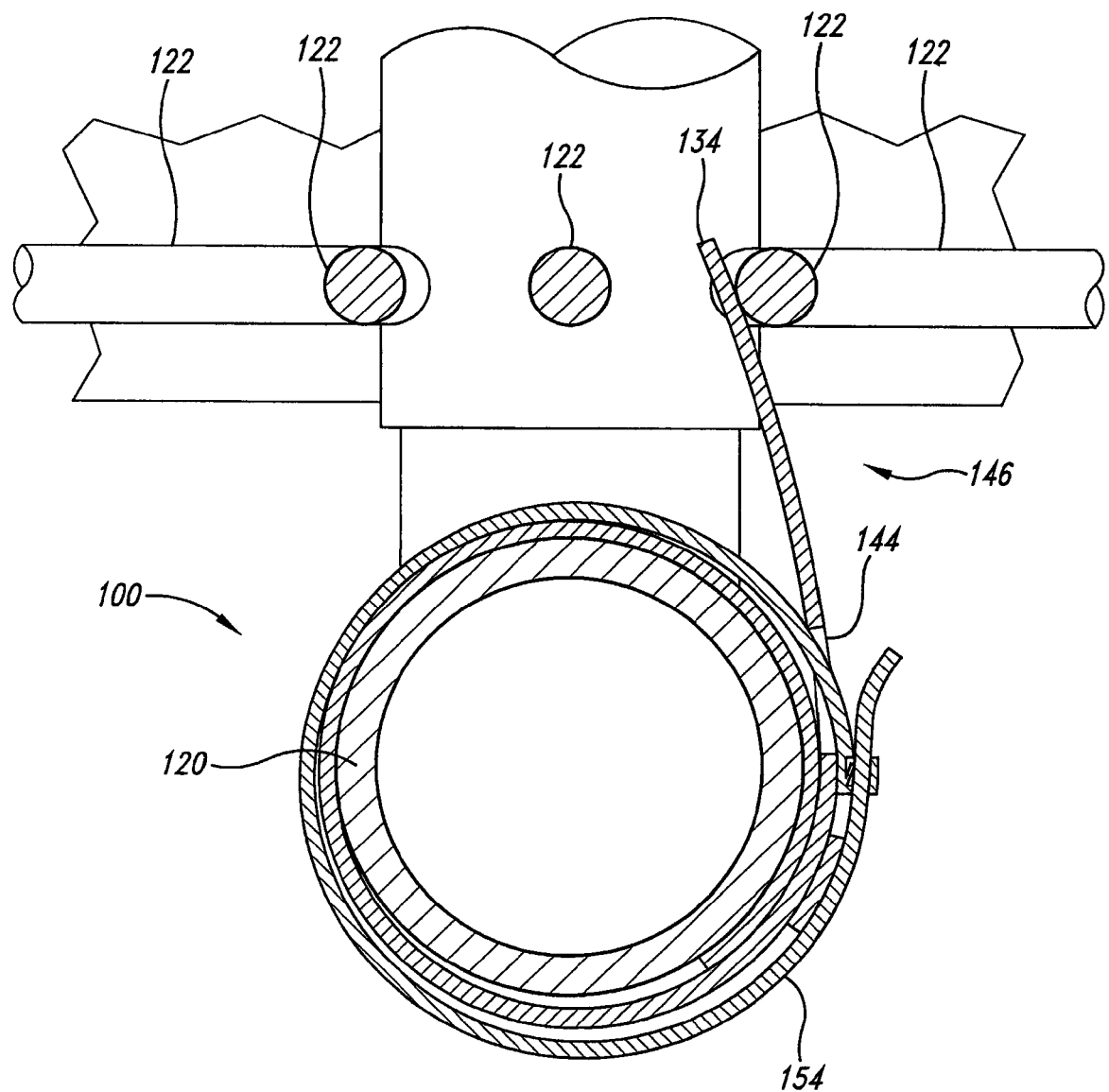

FIGS. 13 and 14 are cross-sectional views illustrating the operation of the sound generator 100. In FIG. 13, the free-end portion 146 of the sound generator 100 has been positioned so that lies in the pathway of the spokes 122 of the front wheel 106. As the front wheel 106 rotates, the spokes 122 engage and displace the free-end portion 146 of the sound generator 100, as illustrated in FIG. 14. As the spoke 122 in contact with the free-end portion 146 of the sound generator 100 passes, the sound generator 100 returns to its resting position, illustrated in FIG. 13. It is this displacement and return to the resting position that causes the characteristic sound created by the sound generator 100.

As best illustrated in FIGS. 13 and 14, the sound generator 100 wraps completely around the front fork 120 and readily adapts to the shape of the front fork. The fastener 154 is secured around the concave side 150 of the sound generator. Thus, the paint finish of the bicycle is protected by the sound generator 100. The fastener 154 has no direct contact with the front fork 120, but only wraps around the convex side 148 of the sound generator 100.

Figure 15:
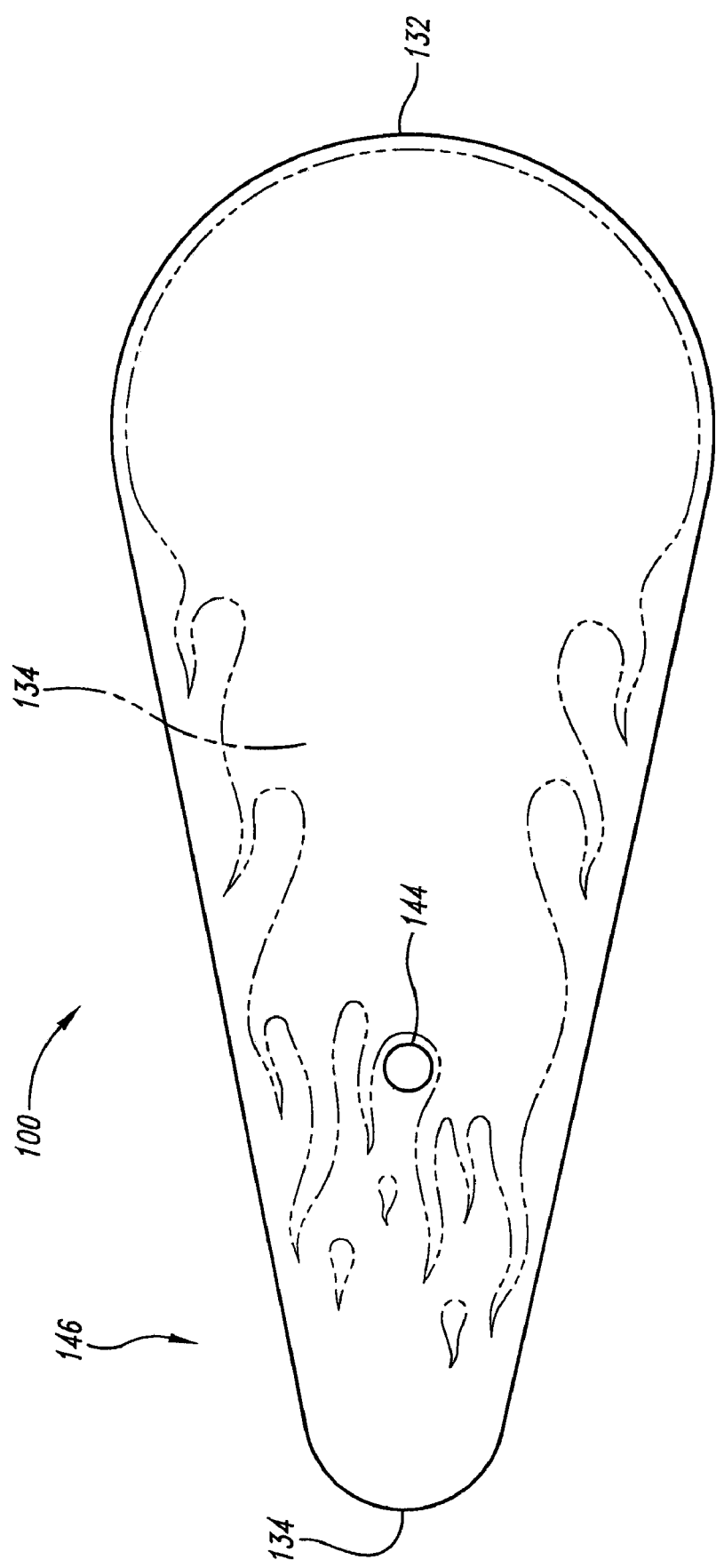
FIG. 15 is a plan view illustrating an alternative embodiment of the bicycle sound generator.

FIG. 15 illustrates an alternative embodiment of the sound generator 100. In this embodiment, the slits 136 are eliminated. The installation proceeds in a manner similar to that described above with respect to claims 10-14. However, the sound generator 100 is wrapped around the attachment location and the second end 134 is not inserted through the slot 138 (see FIG. 10). Rather, the sound generator 100 is wrapped around the attachment location until the aperture 144 is positioned against the bicycle 102 at the attachment location. At that point, the fastener 154 may be inserted through the aperture and wrapped around the attachment location to secure the sound generator 100 in the manner described above.

The sound generator 100 can also be decorated in a fanciful fashion. FIG. 15 illustrates a "flame" decoration 160 mounted at the free-end portion 146 of the sound generator 100. Those skilled in the art can appreciate that other decorations may also be used. In addition, team logos may be used in a promotional campaign. For example, a sports team may place its logo on the sound generator 100 and give the sound generator away to fans. Other campaigns such as anti-drug or anti-smoking messages may also be printed on the sound generator 100. Thus, the sound generator may be readily used for promotional purposes. Those skilled in the art will appreciate that the decoration 160 may also be used in the embodiment illustrated in FIGS. 1-14.

Figure 16:
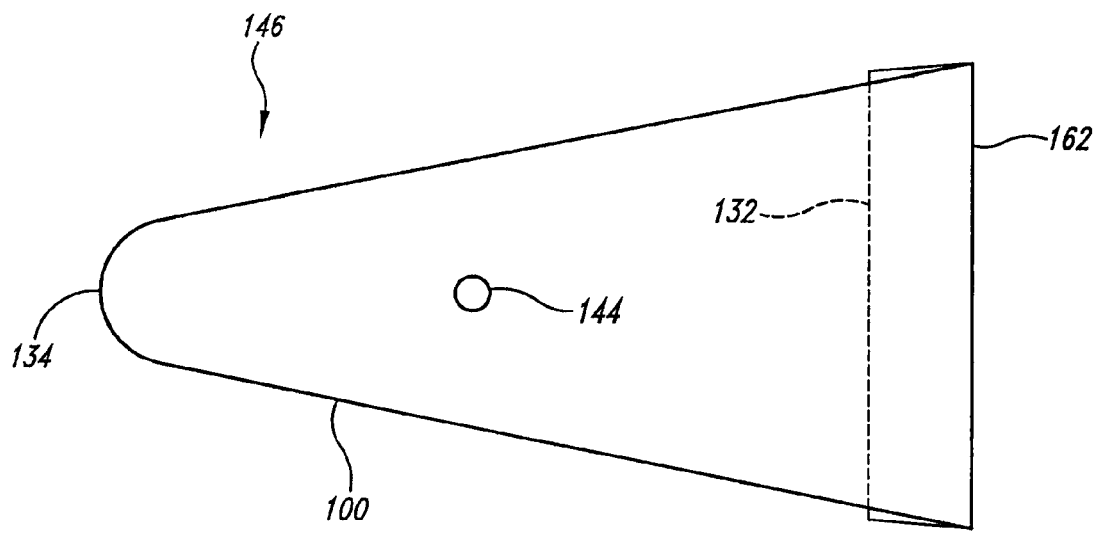
FIG. 16 is a plan view illustrating another alternative embodiment of the bicycle sound generator.
Figure 17:
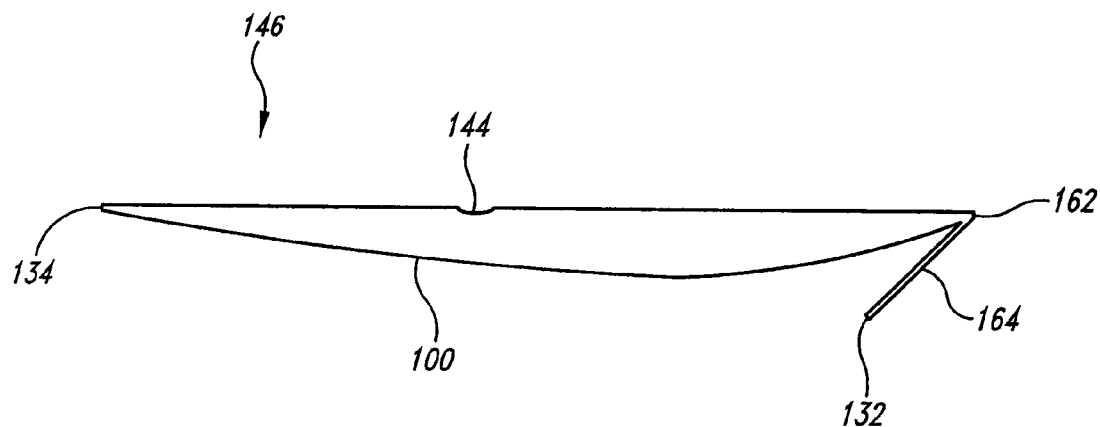
FIG. 17 is a side view of the bicycle sound generator of FIG. 16.

FIGS. 16 and 17 illustrate another alternative embodiment of the sound generator 100. In this example embodiment, the first end 132 is not rounded, but is squared off. Furthermore, a crease 162 is made in the sound generator 100 proximate the first end 132. As best illustrated in FIG. 17, the crease 162 forms a flap 164 in the sound generator 100. The flap 164 has a spring effect that compresses as the sound generator 100 is wrapped around the attachment location (e.g., the front fork 120 of FIG. 1) to provide tension to the wrap to more securely fasten the sound generator to the attachment location.

The foregoing described embodiments depict different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality.

While particular embodiments of the present invention have been shown and described, it will be obvious to those skilled in the art that, based upon the teachings herein, changes and modifications may be made without departing from this invention and its broader aspects and, therefore, the appended claims are to encompass within their scope all such changes and modifications as are within the true spirit and scope of this invention. Furthermore, it is to be understood that the invention is solely defined by the appended claims. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations).

Accordingly, the invention is not limited except as by the appended claims.

The invention claimed is:

1. A bicycle sound generating apparatus for attachment to a bicycle frame at an attachment location, comprising:

a flexible elongated member having first and second opposing ends and having sufficient flexibility to permit the first end to be wrapped around the attachment location of the bicycle frame, the elongated member having a longitudinal axis extending from the first end to the second end and sufficient length to wrap around the bicycle frame at the attachment location with the elongated member second end having sufficient length to extend from the attachment location to an engagement position to permit engagement of bicycle spokes by the second end as a bicycle wheel rotates;

first and second parallel slits in the elongated member transverse to the longitudinal axis and sized to permit the insertion of the second end;

an aperture positioned along the longitudinal axis of the elongated member with the aperture being positioned at a distance from the second end to permit the second end to project from the attachment location to the engagement position; and a fastener sized to fit through the aperture and having sufficient length to completely encircle the elongated member and the bicycle frame at the attachment location to thereby secure the elongated member at the attachment location.

2. The apparatus of claim 1 wherein the elongated member is tapered along the longitudinal axis whereby the first end is wider than the second end.

3. The apparatus of claim 1 wherein the elongated member is manufactured of plastic having a thickness between 0.015 millimeters to 1.0 millimeters.

4. The apparatus of claim 1 wherein the elongated member is a cylindrical section having a cylindrical radius parallel to and spaced apart from the longitudinal axis.

5. The apparatus of claim 1 wherein the elongated member is curved to define a convex surface and a concave surface, the concave surface being configured for mounting facing the attachment location.

6. The apparatus of claim 1 wherein the attachment location is a selected portion of a bicycle frame.

7. The apparatus of claim 6 wherein the attachment location is a selected portion of a bicycle front fork, wherein the second end engages the spokes of the front wheel when the apparatus is in the engagement position.

8. The apparatus of claim 6 wherein the attachment location is a selected portion of a bicycle rear wheel support, wherein the second end engages the spokes of the rear wheel when the apparatus is in the engagement position.

9. The apparatus of claim 1 wherein the apparatus is rotatably mounted at the attachment location and configured to permit the second end of the elongated member to be rotated between the engagement position and a disengagement position where the elongated member second end does not engage the bicycle spokes as the bicycle wheel rotates.

10. A bicycle sound generating apparatus for attachment to a bicycle frame at an attachment location, comprising:

a flexible elongated member having first and second opposing ends and a longitudinal axis extending from the first end to the second end, the elongated member having sufficient flexibility and length to permit the first end to be wrapped around the attachment location of the bicycle frame with the elongated member second end having sufficient length to extend from the attachment location to an engagement position to permit engagement of bicycle spokes by the second end as a bicycle wheel rotates;

an aperture in the elongated member; and a fastener sized to fit through the aperture and having sufficient length to encircle the flexible member and thereby secure the elongated member at the attachment location.

11. The apparatus of 10, further comprising first and second parallel slits in the elongated member transverse to the longitudinal axis and sized to permit the insertion of the second end.

12. The apparatus of claim 10 wherein the elongated member is tapered along the longitudinal axis whereby the first end is wider than the second end.

13. The apparatus of claim 10 wherein the elongated member is a cylindrical section having a cylindrical radius parallel to and spaced apart from the longitudinal axis.

14. The apparatus of claim 10 wherein the elongated member is curved to define a convex surface and a concave surface, the concave surface being configured for mounting facing the attachment location.

15. The apparatus of claim 10 wherein the aperture is positioned along the longitudinal axis of the elongated member with the aperture being positioned at a distance from the second end to permit the second end to project from the attachment location to the engagement position.

16. The apparatus of claim 10 wherein the attachment location is a selected portion of a bicycle frame.

17. The apparatus of claim 16 wherein the attachment location is a selected portion of a bicycle front fork, wherein the second end engages the spokes of the front wheel when the apparatus is in the engagement position.

18. The apparatus of claim 16 wherein the attachment location is a selected portion of a bicycle rear wheel support, wherein the second end engages the spokes of the rear wheel when the apparatus is in the engagement position.

19. The apparatus of claim 10 wherein the apparatus is rotatably mounted at the attachment location and configured to permit the second end of the elongated member to be rotated between the engagement position and a disengagement position where the elongated member second end does not engage the bicycle spokes as the bicycle wheel rotates.

20. The apparatus of claim 10, further comprising a flap portion formed near the elongated member first end by a crease in the elongated member substantially perpendicular to the longitudinal axis.

21. A sound generating method for use with a bicycle, comprising:
wrapping a flexible elongated member around an attachment location on a bicycle frame, the elongated member having first and second opposing ends and having sufficient flexibility to permit the first end to be wrapped around the attachment location and sufficient length to permit the first end to wrap around the bicycle frame at the attachment location with the second end extending from the attachment location to an engagement position to permit engagement of bicycle spokes by the second end as a bicycle wheel rotates;
inserting a fastener in an aperture in the elongated member and wrapping the fastener completely around the elongated member first end and the attachment location to thereby secure the elongated member at the attachment location; and
moving the second end of the elongated member into the engagement position.

22. The method of claim 21 wherein wrapping the flexible elongated member around the attachment location further comprises inserting the second end of the elongated member through first and second parallel slits in the elongated member.

23. The method of claim 21 wherein the elongated member is tapered whereby the second end is narrower than the first end and moving the second end of the elongated member into the engagement position comprises moving the narrow tapered second end into the engagement position.

24. The method of claim 21 wherein the elongated member has a longitudinal axis extending from the first end to the second end and the elongated member is a cylindrical section having a cylindrical radius parallel to and spaced apart from the longitudinal axis.

25. The method of claim 21 wherein the flexible member is curved to define a convex surface and a concave surface and wrapping the flexible elongated member around the attachment location comprises placing the concave surface facing the attachment location.

26. The method of claim 21 wherein the elongated member is rotatably mounted at the attachment location and configured to permit the second end of the elongated member to be rotated between the engagement position and a disengagement position at which the elongated member second end does not engage the bicycle spokes as the bicycle wheel rotates.

27. The method of claim 21 wherein the attachment location is a selected portion of a bicycle frame.

28. The method of claim 27 wherein the attachment location is a selected portion of a bicycle front fork, wherein the second end engages the spokes of the front wheel when the apparatus is in the engagement position.

29. The method of claim 27 wherein the attachment location is a selected portion of a bicycle rear wheel support, wherein the second end engages the spokes of the rear wheel when the apparatus is in the engagement position.

30. A bicycle sound generating apparatus for attachment to a bicycle frame at an attachment location, comprising:
a flexible elongated member having first and second opposing ends and having sufficient flexibility and length to permit the first end to be wrapped around the attachment location of the bicycle frame with the flexible member second end extending from the attachment location to an engagement position to permit engagement of bicycle spokes by the second end as a bicycle wheel rotates;
an aperture in the flexible member; and
a fastener sized to fit through the aperture and extend completely around the flexible member first end and the attachment location to thereby secure the flexible member at the attachment location.

31. A bicycle sound generating apparatus for attachment to a bicycle frame at an attachment location using a fastener to secure the apparatus at the attachment location, comprising:
a flexible elongated member having first and second opposing ends and a longitudinal axis extending from the first end to the second end, the flexible member having sufficient flexibility to permit the first end to be wrapped around the attachment location of the bicycle frame with the flexible member second end having sufficient length to extend from the attachment location to an engagement position to permit engagement of bicycle spokes by the second end as a bicycle wheel rotates;
a flap portion formed near the flexible member first end by a crease in the flexible member substantially perpendicular to the longitudinal axis; and
an aperture in the flexible member sized to receive the fastener, wherein the apparatus is secured at the attachment location by the fastener having sufficient length to encircle the flexible member and thereby secure the flexible member at the attachment location.

* * * * *